United States Patent Office 3,316,445
Patented Apr. 25, 1967

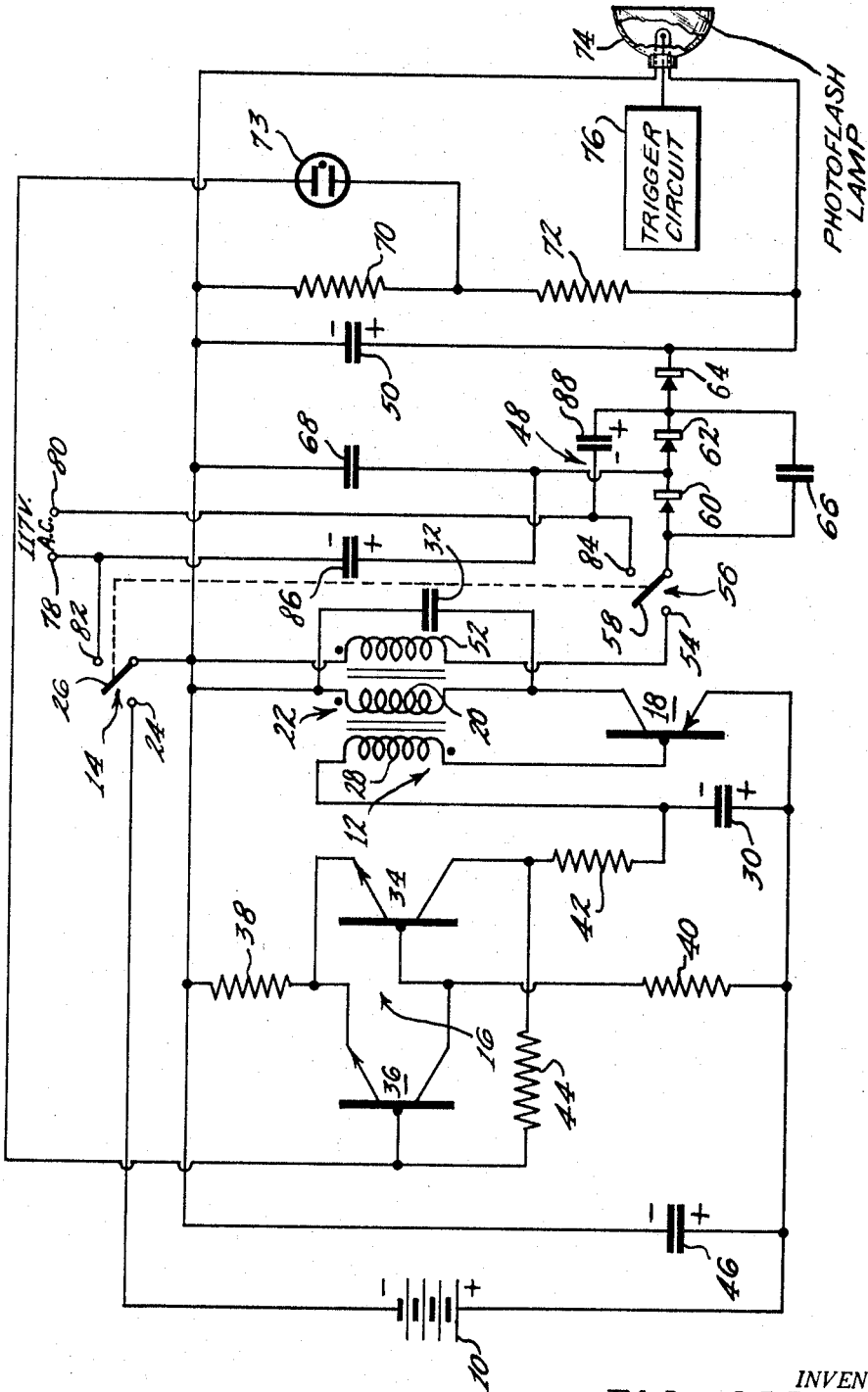

3,316,445
TRANSISTORIZED POWER SUPPLY FOR A STORAGE CAPACITOR WITH A REGULATING FEEDBACK CONTROL
Richard W. Ahrons, Somerville, N.J., assignor to Radio Corporation of America, a corporation of Delaware
Continuation of application Ser. No. 686,411, Sept. 26, 1957. This application Apr. 26, 1963, Ser. No. 277,069
18 Claims. (Cl. 315—183)

The present application is a continuation of my prior application Ser. No. 686,411, filed Sept. 26, 1957, now abandoned. This invention relates to power supplies generally, and more particularly to a battery operated, transistorized power supply having automatic output voltage control means and a low, standby battery drain. The power supply of the present invention is particularly useful for operating electronic photoflash equipment and the like.

Electronic photoflash units are in common use for illuminating objects to be photographed. These electronic photoflash units employ a power supply wherein a large output capacitor is charged, over a period of time, to a voltage of sufficient amplitude to supply a photoflash lamp. These power supplies usually employ a mechanical vibrator for the purpose of converting a relatively low battery voltage to the relatively high unidirectional voltage required for the photoflash lamp. Since it is customary to ready an electronic flash unit by energizing it before a photographic picture is to be taken, the output capacitor of the unit is energized continuously until the voltage across it is applied to the photoflash lamp. The drain on the batteries during this stand-by operation may be considerable, and reduces the battery life. Also, the light available from the photoflash lamp decreases as the output voltage of the battery source decreases.

Accordingly, it is an object of the present invention to provide an improved battery operated power supply that has automatic output voltage control means and a low stand-by drain.

It is another object of the present invention to provide an improved battery operated power supply employing a transistorized oscillator circuit and a transistorized switching circuit connected in a manner to turn the oscillator circuit on and off in response to predetermined amplitudes of the output voltage of the power supply.

A further object of the present invention is to provide an improved battery operated, transistorized power supply, suitable for electronic photoflash equipment, that is easy to construct and to operate, and is highly efficient in use.

These objects and related advantages of the present invention are attained in an improved power supply wherein the voltage from a source of relatively low battery voltage is converted to a relatively high unidirectional output voltage across an output capacitor. The battery voltage is applied to a transistor oscillator circuit. A suitable bias voltage is applied to a control electrode of the transistor of the oscillator circuit, through a switching circuit, to cause the oscillator circuit to oscillate. The output of the oscillator is rectified and applied as a unidirectional output voltage across the output capacitor. The voltage across the output capacitor may be applied to a utilization circuit, such as a photoflash lamp, and the like.

Automatic output voltage control means are provided, in accordance with the present invention, to cause the output capacitor of the power supply to acquire a desired output voltage, and to maintain the output voltage within a desired range, with a minimum of battery drain, during a stand-by period. For this purpose, a sample of the output voltage is fed back to the switching circuit through a neon lamp. When the output voltage has reached a desired value, the neon lamp conducts and causes current to flow through it to the switching circuit. This current alters the bias on the oscillator and causes it to stop oscillating. When the output voltage of the power supply has decayed to a predetermined value, the neon lamp current is diminished to a critical value and the switching circuit transfers to the conducting state. Under these conditions, a suitable bias is applied again to the oscillator to cause it to oscillate, whereby the output capacitor may be charged. This action continues until the neon lamp conducts heavily again and transfers the switching circuit to the non-conducting state. Thus, the output capacitor is charged intermittently during the stand-by period, but at no time is the output capacitor's voltage allowed to decrease beyond that necessary for the utilization circuit.

The novel features of the present invention, as well as the invention itself, both as to its organization and method of operation, will be understood in detail from the following description when considered in connection with the accompanying drawing which is a schematic diagram of a transistorized electronic photoflash unit employing a transistorized power supply in accordance with the present invention.

The power supply of the present invention will be described in connection with an electronic photoflash unit. It will be understood, however, that this use of the power supply is merely illustrative, and is not to be construed in a limiting sense.

Referring now to the drawing, there is shown a source of relatively low, unidirectional voltage, such as a battery 10. The battery 10 may comprise a plurality of serially connected dry cells, for example, as the primary source of energy of the power supply. Means are provided to convert the energy of the battery 10 into alternating current (A.-C.) voltages. To this end, the battery 10 is connected to a transistorized oscillator circuit 12 through a switch 14 and a transistorized switching circuit 16.

The oscillator circuit 12 comprises a power transistor 18 having an emitter connected to the positive terminal of the battery 10, and a collector connected to the primary 20 of a transformer 22. The negative terminal of the battery 10 is connected to the primary winding 20 through the contact 24 and the armature 26 of the switch 14. For regenerative purposes, one end of the secondary winding 28 of the transformer 22 is connected to the base of the transistor 18, and the other end is connected to the emitter of the transistor 18 through a by-pass capacitor 30. A capacitor 32 is connected across the primary winding 20 to form a resonant circuit therewith.

The oscillator circuit 12 is biased to oscillate by a unidirectional voltage applied to the base of the transistor 18 through the transistorized switching circuit 16. The switching circuit 16 comprises a normally conducting transistor 34 and a normally cut off, that is, non-conducting transistor 36. The emitters of the transistors 34 and 36 are connected to each other and to the primary winding 20 of the transformer 22 through a resistor 38. The collector of the transistor 36 is connected directly to the base of the transistor 34, and to the emitter of the transistor 18 through a resistor 40. The collector of the transistor 34 is connected to the secondary 28 of the transformer 22 through a biasing resistor 42. A resistor 44 is connected between the collector of the transistor 34 and the base of the transistor 36 for feed back purposes.

It will now be understood that the transistor oscillator circuit 12 receives its operating bias potential from the battery 10 through the normally conducting transistor 34 of the switching circuit 16. Thus, suitable operating bias is applied to the base of the transistor 18 through the resistor 38, the emitter-collector path of the transistor 34, the resistor 42, and the secondary winding 28. A capacitor 46 is connected between the armature 26 of the switch 14 and the positive terminal of the battery 10.

The voltage oscillations in the tuned circuit of the oscillator circuit 12 are rectified by a rectifier tripling circuit 48 and applied as a unidirectional voltage across an output capacitor 50. To this end, a tertiary winding 52 of the transformer 22 has one end connected to the upper junction between the primary 20 and the capacitor 32, as shown in the drawing, and the other end connected to the contact 54 of a switch 56. The armature 58 of the switch 56 is connected to the output capacitor 50 through three serially connected diodes 60, 62, and 64. A capacitor 66 is connected between the anode of the diode 60 and the cathode of the diode 62. A capacitor 68 is connected between the anode of the diode 62 and the upper junction between the primary winding 20 and the capacitor 32. It will now be understood that the diodes 60, 62, and 64 and their associated capacitors 66 and 68 comprise rectifying and voltage tripling means of the type known in the art, whereby to rectify and to multiply the voltage oscillations induced into the tertiary windings 52 by the resonant circuit of the oscillator circuit 12. The output of the rectifying and tripling circuit is applied across the output capacitor 50.

The switches 14 and 56 are ganged together, forming a double pole-double throw switch, for simultaneous movement. It will now be understood that, with the armature 26 of the switch 14 in contact with the contact 24, and with the armature 58 of the switch 56 in contact with the contact 54, the transistor oscillator circuit 12 will oscillate because of suitable bias applied to it via the conducting transistor 34 of the switching circuit 16. The voltage oscillations of the transistor oscillator circuit 12 are rectified, multiplied, and applied as a relatively high unidirectional voltage across the output capacitor 50.

Since the capacitor 50 is an electrolytic capacitor, any charge applied to it will leak off at an exponential rate during a stand-by period. Accordingly, means are provided to cease charging the output capacitor 50 when it has acquired a desired voltage thereacross, and to recharge the output capacitor 50 when the charge thereacross has decayed to a minimum desired voltage within a range of desired voltages. Means are provided to sample the output voltage across the output capacitor 50. To this end, a voltage divider comprising serially connected resistors 70 and 72 is connected across the output capacitor 50. A neon lamp 73 is connected between the common junction of the resistors 70 and 72 and the base of the transistor 36 in the switching circuit 16 for the purpose hereinafter appearing.

The utilization circuit for the power supply described herein may be a photoflash lamp 74 connected across the output capacitor 50. A triggering circuit 76, illustrated in the drawing in block diagram form, may be of any suitable circuitry known in the art for triggering the photoflash lamp 74 on.

The power supply of the present invention, for the sake of completeness of description, also embodies means for rectifying an A.-C. line voltage for charging the output capacitor 50. Thus, a pair of input terminals 78 and 80 are adapted to be applied to any suitable source of line voltage, say 117 volts A.-C. A contact 82 of the switch 14 is adapted to be contacted by the armature 26; and a contact 84 of the switch 56 is adapted to be contacted by the armature 58 when the power supply is to be energized from A.-C. line voltage. Under these conditions, the terminal 78 is connected to the cathode of the diode 60 through a capacitor 86, and the terminal 80 is connected to the cathode of the diode 62 through a capacitor 88. It will now be understood that the A.-C. line voltage applied to the terminals 78 and 80 will be rectified and tripled by the rectifier circuit 48, and the rectified voltage will be applied across the output capacitor 50.

The operation of the transistorized power supply, in accordance with the present invention, will now be explained: When the switches 14 and 56 are closed for battery operation, the battery 10 energizes the transistor oscillator circuit 12. The transistor oscillator circuit 12 oscillates by virtue of feedback from the collector to the base of the power transistor 18. The capacitor 30 provides a return path to the emitter for the base current at the oscillating frequency. Direct current (D.-C.) base-to-emitter bias is provided through the resistor 42, the transistor 34 and the resistor 38. The frequency of oscillation of the oscillator circuit 12, determined by the tank comprising the primary winding 20 and the capacitor 32, is in the order of 10 kilocycles, in the instant example.

The output capacitor 50, in the instant example, may be charged to 450 volts. Thus, when the voltage across the capacitor 50 reaches 450 volts, the neon lamp 73, which also acts as a "ready signal light," turns on. The current through the neon lamp 73 provides base-to-emitter current for the transistor 36 which is normally non-conducting. The transistor 36 of the switching circuit 16 is thus turned on, and the transistor 34 is cut off, as will be explained in detail hereinafter. By this action, the D.-C. base-to-emitter bias of the transistor 18 is also turned off, and the oscillator circuit 12 stops oscillating.

As the voltage across the output capacitor 50 reduces, due to leakage, over a period of time, the current through the neon lamp 73 also reduces. As the current through the neon lamp decreases, however, it reaches a value where it can no longer maintain the transistor 36 of the swtiching circuit 16 in a turned on state. The turn-off process is then initiated and the transistor oscillator circuit 12 commences operation, whereby the cycle is repeated.

The operation of the transistor switching circuit 16 will now be described: The transistor 34 is normally conducting as the output capacitor 50 is charging. When the neon lamp 73 is turned on, to signify that the voltage across the output capacitor 50 has reached its proper value, the current through the neon lamp 73 provides base current for the transistor 36 of the switching circuit 16. The collector of the transistor 36 now conducts current and the voltage across the resistor 40 rises. Thus, the base current through the transistor 34 decreases, in turn decreasing the collector current of the transistor 34. The voltage across the resistor 38 is now reduced; hence, this tends to increase conduction in the emitter of the transistor 36. Simultaneously, the voltage across the transistor 34 increases, increasing the current flowing in the resistor 44. This tends to increase the base current in the transistor 36. This action forces the transistor 36 well into saturation, and cuts the transistor 34 off.

If the current through the neon lamp 73 decays to a critical value, the value at which the base current in the transistor 36 is too small to maintain it in a state of saturation, the transistor 36 will be cut off and the transistor 34 will conduct again.

Thus, there has been shown and described, in accordance with the objects of the present invention, a transistorized electronic power supply adapted ot reduce battery drain during a stand-by period, and to automatically control the output voltage within a range of desired output voltages.

What is claimed is:

1. A power supply of the type adapted to provide an output voltage within a predetermined range, said power supply comprising an oscillator circuit, means to apply a source of unidirectional voltage to said oscillator circuit whereby to cause voltage oscillations therein, rectifying means, means connecting asid rectifying means to said oscillator circuit to rectify said voltage oscillations and to provide said output voltage, a gas lamp, means to sample said output voltage, and means including said gas lamp to feed back a signal from said sampling means to said oscillator circuit to stop oscillations therein when said output voltage reaches a first value in said predetermined range and to cause said oscillator circuit to be turned on automatically when said output voltage decays to a second value in said predetermined range, said voltage applying means to said oscillator circuit comprising a switching circuit for applying an operating bias to said oscillator circuit, said feedback means including said switching circuit.

2. A power supply comprising an oscillator circuit, said oscillator circuit comprising a current conducting device having a control electrode and at least two other electrodes, means to apply a source of unidirectional voltage between said two other electrodes, switching means, means to apply a bias voltage to said control electrode through said switching means to cause said oscillator circuit to oscillate, rectifying means, an output capacitor, means connecting said rectifying means between asid oscillator circuit and said output capacitor to apply rectified oscillations of said oscillator circuit to said output capacitor and thereby provide a voltage across said output capacitor, means to sample said voltage across said output capacitor, a gas lamp, and feedback means including said gas lamp connecting said voltage sampling means with said switching means, said switching means comprising means to remove said bias voltage and to cut off said oscillations in said oscillator circuit when said voltage across said capacitor has a first predetermined value and to restore said bias voltage to turn said oscillator circuit on automatically when said voltage across said capacitor decays to a second predetermined value.

3. In a power supply of the type wherein the voltage of a source of relatively low unidirectional voltage is converted to a relatively high unidirectional output voltage across an output capacitor, an oscillator circuit, switching means, means including said switching means to apply said source to said oscillator circuit to cause voltage oscillations therein, said switching means comprising means to bias said oscillator on, rectifying means, means to couple said oscillator circuit to said rectifying means to rectify said voltage oscilaltions, means to connect said rectifying means to said output capacitor to apply said rectified voltage oscillations thereacross, a gas lamp, means to sample the voltage across said output capacitor, and means including said gas lamp to feed back said sample voltage to said switching means, said switching means comprising means responsive to the amplitude of said feed-back sample voltage to remove said bias on said oscillator circuit and to cut it off when said output voltage has a first predetermined value and to restore said bias to cause said oscillator circuit to oscillate automatically when said output voltage has decayed to a second predetermined value.

4. In a power supply of the type wherein an oscillator circuit is caused to oscillate, and wherein the voltage oscillations of said oscillator circuit are transformed and rectified to provide a relatively high output voltage for the power supply, the combination therewith of a switching circuit comprising a normally conducting device and a normally non-conducting device connected to operate as a multivibrator, means to connect a source of bias voltage to said oscillator through said normally conducting device to cause said oscillator circuit to oscillate, a gas lamp, and means to sample said output voltage and to feed back a signal through said gas lamp to said normally non-conducting device to cause it to conduct and to cause said normally conducting device to cease conducting when said output voltage has reached a first predetermined value, said feedback means comprising means to remove said signal and to cause said oscillator circuit to oscillate again automatically when said output voltage has descreased to a second predetermined value.

5. Apparatus for charging a capacitor and for maintaining a voltage thereacross within a predetermined range, said apparatus comprising an oscillator circuit, means to apply an operating voltage to said oscillator circuit to maintain said oscillator circuit operating, means connected between said oscillator circuit and said capacitor to rectify voltage oscillations in said oscillating circuit and to apply them across said capacitor, a gas lamp, a voltage divider connected across said capacitor, and means connected to a point on said voltage divider to feed back a sample of said voltage across said capacitor to said voltage applying means for said oscillator, said last-mentioned means comprising means including said gas lamp to stop said oscillator circuit from oscillating when said voltage across said capacitor is at a first voltage in said predetermined range and means to cause said oscillator to oscillate automatically when said voltage across said capacitor is at a second voltage in said predetermined range.

6. A power supply comprising an oscillator circuit having a first current conducting device, said first current conducting device having a control electrode for controlling the current through said first device, a switching circuit having second and third current conducting devices connected as a multivibrator with said second device normally conducting and said third device normally cut off, means to apply a source of operating voltage to said oscillator circuit and to said switching circuit, means connecting the current path of said second device to said control electrode of said first device to apply an operating bias to said oscillator circuit, rectifying means, means to rectify voltage oscillations in said oscillator circuit and to provide a unidirectional output voltage, and means to feed back a signal proportional to said output voltage to said third, normally cut off device to cause it to conduct whereby to cut off conduction in said second device when said output voltage reaches a first predetermined voltage and to cut off conduction through said third device when said output voltage falls to a second predetermined output voltage, whereby to cause said second current device to conduct and said oscillator circuit to oscillate automatically.

7. An electrical circuit comprising, in combination: a storage capacitor, a transistor vibrator for charging said capacitor from a source of D.-C. potential; a control transistor connected to render said vibrator inoperative when said control transistor is biased to conduction; and a circuit element, conductive upon the application thereto of a predetermined potential, connected to render said control transistor conductive in response to the existence of a predetermined voltage on said capacitor.

8. In a battery-operated power supply for energizing an intermittently operated utilization means and for maintaining an output voltage within a range of voltages of sufficient magnitude to operate said utilization means, the combination comprising
 (a) an oscillator circuit,
 (b) means to couple the battery to said oscillator circuit for normally causing oscillations in said oscillator circuit,
 (c) rectifying means,
 (d) means connecting said rectifying means to said oscillator circuit to rectify said oscillations and to provide said output voltage, and
 (e) means including a voltage responsive element coupled to said rectifying means to feed back to said oscillator circuit a voltage responsive to said output voltage to stop oscillations in said oscillator circuit when said output voltage reaches a first value at the high voltage end of said range of voltages and to cause said oscillator circuit to be turned on automatically when said output voltage decays to a second value at the low voltage end of said range of voltages to maintain said output voltage at a value within said range of voltages in readiness to operate said utilization means.

9. In a battery-operated power supply for energizing an intermittently operated utilization means and for maintaining an output voltage within a range of voltages of sufficient magnitude to operate said utilization means, the combination comprising
  (a) an oscillator circuit,
  (b) means to couple the battery to said oscillator circuit for normally causing oscillations in said oscillator circuit,
  (c) rectifying means,
  (d) means connecting said rectifying means to said oscillator circuit to rectify said oscillations and to provide said output voltage, and
  (e) a feedback circuit including switch means coupled to said oscillator circuit and responsive to said output voltage for feeding back to said oscillator circuit
    (1) a first voltage of a magnitude to operate said switch means in a first sense when said output voltage reaches a first value at the high voltage end of said range of voltages for stopping oscillations in said oscillator circuit, and
    (2) a second voltage of a magnitude to operate said switch means in the opposite sense when said output voltage decays to a second value at the low end of said range of voltages to cause said oscillator circuit to be turned on automatically,
  said switch means being thus effective to insure maintaining said output voltage at a value within said range of voltages in readiness to operate said utilization means.

10. In a battery-operated power supply for energizing an intermittently operated utilization means for maintaining an output voltage within a range of voltages of sufficient magnitude to operate said utilization means, the combination comprising
  (a) an oscillator circuit,
  (b) means to couple the battery to said oscillator circuit for normally causing oscillations in said oscillator circuit,
  (c) rectifying means,
  (d) means connecting said rectifying means to said oscillator circuit to rectify said oscillations and to provide said output voltage, and
  (e) a feedback circuit including
    (1) a voltage responsive element coupled to said rectifying means, and
    (2) switch means coupled to said oscillator circuit,
  (f) said feedback circuit being adapted to feed back to said oscillator circuit through said voltage responsive element
    (1) a first voltage of a magnitude to operate said switch means in a first sense when said output voltage reaches a first value at the high end of said range of voltages to stop oscillations in said oscillator circuit, and
    (2) a second voltage of a magnitude to operate said switch means in the opposite sense when said output voltage decays to a second value at the low end of said range of voltages to cause said oscillator circuit to be turned on automatically,
  (g) said voltage responsive element and said switch means thereby being effective to insure maintaining said output voltage at a value within said range of voltage in readiness to operate said utilization means.

11. In combination with a photoflash lamp operable by triggering means to provide a flash of light, a battery-operated power supply coupled to said lamp for providing an output voltage within a range of voltages of sufficient magnitude to operate said lamp at will through said triggering means, said power supply comprising
  (a) an oscillator circuit,
  (b) means to couple the battery to said oscillator circuit for normally causing oscillations in said oscillator circuit,
  (c) rectifying means,
  (d) means connecting said rectifying means to said oscillator circuit to rectify said oscillations thereby to provide said output voltage, and
  (e) a feedback circuit including
    (1) a voltage responsive element coupled to said rectifying means, and
    (2) switch means coupled to said oscillator circuit,
  (f) said feedback circuit being adapted to feed back to said oscillator circuit through said voltage responsive element
    (1) a first voltage of a magnitude to operate said switch means in a first sense when said output voltage reaches a first value at the high end of said range of voltages to stop oscillations in said oscillator circuit, and
    (2) a second voltage of a magnitude to operate said switch means in the opposite sense when said output voltage decays to a second value at the low end of said range of voltages to cause said oscillator circuit to be turned on automatically,
  (g) said voltage responsive element and said switch means thereby being effective to insure maintaining said output voltage at a value within said range of voltages in readiness to operate said lamp upon actuation of said triggering device.

12. In a battery-operated power supply for energizing an intermittently operated utilization means and for maintaining an output voltage within a range of voltages of sufficient magnitude to operate said utilization means, the combination comprising
  (a) an oscillator circuit,
  (b) means to couple the battery to said oscillator circuit for normally causing oscillations in said oscillator circuit,
  (c) rectifying means,
  (d) means connecting said rectifying means to said oscillator circuit to rectify said oscillations and to provide said output voltage, and
  (e) means including a combined voltage responsive and light emitting indicating device coupled to said rectifying means to feed back to said oscillator circuit a voltage responsive to said output voltage to stop oscillations in said oscillator circuit when said output voltage reaches a first value at the high voltage end of said range of voltages and to cause said oscillator circuit to be turned on automatically when said output voltage decays to a second value at the low voltage end of said range of voltages to maintain said output voltage at a value within said range of voltages in readiness to operate said utilization means,
  (f) said light emitting indicating device being operable within said range of voltages to indicate said readiness.

13. In a battery-operated power supply for energizing an intermittently operated utilization means and for maintaining an output voltage within a range of voltages of sufficient magnitude to operate said utilization means, the combination comprising
  (a) an oscillator circuit,
  (b) means to couple the battery to said oscillator circuit for normally causing oscillations in said oscillator circuit,
  (c) rectifying means,
  (d) means connecting said rectifying means to said oscillator circuit to rectify said oscillations and to provide said output voltage, and
  (e) a feedback circuit connected between said rectifying means and said oscillator circuit and including a voltage responsive indicating device responsive to said output voltage, said feedback circuit being adapted to feed back to said oscillator circuit, through said indicating device,
    (1) a first voltage effective to stop oscillations in said oscillator circuit when said output voltage reaches a first value ta the high voltage end of said range of voltages, and (2) a second voltage effective to automatically restore oscillations in said oscillator circuit when said output voltage decays to a second value at the low voltage end of said range of voltages, (f) said output voltage thereby being automatically maintained within said range of voltages, and said indicating device being operable within said range of voltages to indicate whether said output voltage is being maintained within said range of voltages and thus the readiness of said power supply to energize said utilization means.

14. A battery-operable power supply for energizing a photoflash lamp which requires the application thereto of a certain voltage within at least a given range of voltages to provide a useful light flash, said power supply comprising, in combination, (a) an oscillator circuit,
(b) means to couple the battery to said oscillator circuit for normally causing oscillations in said oscillator circuit,
(c) rectifying means,
(d) means connecting said rectifying means to said oscillator circuit to rectify said oscillations and to provide an output voltage within said range of voltages, and
(e) a feedback circuit connected between said rectifying means and said oscillator circuit, said feedback circuit including a gas discharge glow lamp responsive to said output voltage and adapted to be energized to glow and thus provide an indication of the continuance of said output voltage, said feedback circuit being adapted to feed back to said oscillator circuit, through said glow lamp, (1) a first voltage effective to stop oscillations in said oscillator circuit when said output voltage reaches a first value at the high voltage end of said range of voltages, and (2) a second voltage effective to automatically restore oscillations in said oscillator circuit when said output voltage decays to a second value at the low voltage end of said range of voltages, (f) said output voltage thereby being automatically maintained within said range of voltages, and said glow lamp serving to indicate the continuance of said output voltage and, thus, the readiness of said power supply to energize the photoflash lamp.

15. Apparatus for maintaining a voltage across a capacitor including a D.-C. power supply connected to the capacitor, a transistor switching circuit connected to the power supply and having a first operating state during which said power supply is activated, thus permitting the power supply to charge the capacitor, and also having a second operating state during which the power supply is inactivated, and triggering means connected to the capacitor and to the transistor switching circuit for triggering the transistor switching circuit to said first state in response to a voltage across the capacitor less than a predetermined value and for triggering the transistor switching circuit to said second state in response to a voltage across the capacitor greater than a predetermined value.

16. Apparatus for maintaining a voltage across a capacitor including a D.-C. power supply connected to the capacitor, a switching circuit including a pair of regeneratively cross-coupled transistors, the switching circuit being connected to said power supply and adapted to activate the power supply when the switching circuit is in a first operating state and to inactivate the power supply when the switching circuit is in a second operating state, and voltage reference means connecting said capacitor to said switching circuit for triggering the switching circuit to said first operating state in response to a voltage across the capacitor less than a predetermined value and for triggering the switching circuit to said second operating state in response to a voltage across the capacitor greater than a predetermined value.

17. Apparatus for maintaining a voltage across a capacitor including a transistor D.-C. power supply connected to the capacitor, a switching circuit including a pair of regeneratively cross-coupled transistors, the switching circuit having a first operating state established by a first set of conduction conditions of said switching circuit transistors and having a second operating state established by a second set of conduction conditions of said switching circuit transistors, circuit means connecting the switching circuit to the D.-C. power supply for providing transistor operating bias to the D.-C. power supply to activate the D.-C. power supply when the switching circuit is in the first operating state and to inactivate the D.-C. power supply when he switching circuit is in the second operating state, and voltage reference means connecting the capacitor to said switching circuit for triggering the switching circuit transistors from the first set of conduction conditions to the second set of conduction conditions in response to a voltage across the capacitor greater than a predetermined value and for triggering the switching circuit transistors from the second set of conduction conditions to the first set of conduction conditions in response to a voltage across the capacitor less than a predetermined value.

18. An electrical circuit comprising, in combination: a storage capacitor; a transistor vibrator for charging said capacitor from a source of D.-C. potential; a control transistor circuit connected to render said vibrator inoperative when said control transistor circuit is biased to a particular conduction condition; and a circuit element, conductive upon the application thereto of a predetermined potential, connected to bias said control transistor circuit to said particular conduction condition in response to the existence of a predetermined voltage on said capacitor.

References Cited by the Examiner

UNITED STATES PATENTS

| 2,383,492 | 8/1945 | Klemperer | 320—1 |
| 2,738,445 | 4/1952 | Danziger | 321—2 X |
| 2,745,052 | 5/1956 | Willemse | 315—241 X |
| 2,791,739 | 5/1957 | Light | 320—1 |
| 2,841,712 | 7/1958 | Hoge et al. | 307—88.5 |
| 2,944,191 | 5/1960 | Kapteyn | 315—183 |
| 2,946,924 | 7/1960 | Gerlach et al. | 315—241 |
| 3,105,170 | 9/1963 | Palmer | 315—183 |
| 3,213,344 | 10/1965 | Jensen | 320—1 |

JAMES W. LAWRENCE, *Primary Examiner.*

C. R. CAMPBELL, *Assistant Examiner.*